Sept. 16, 1947.  H. L. JOHNSON  2,427,461
HYDRAULIC TRACTOR LOADER
Filed March 13, 1945  5 Sheets-Sheet 1
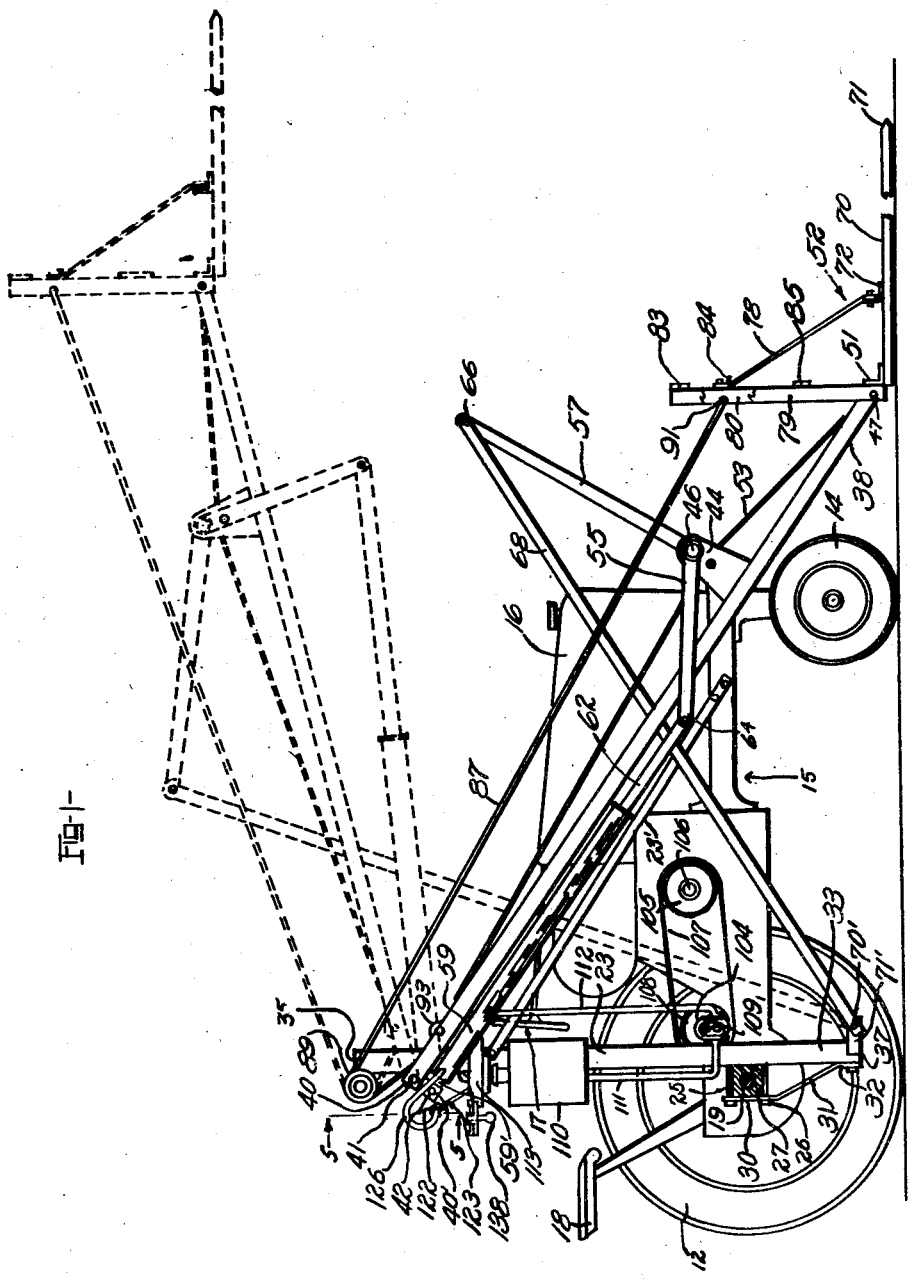
INVENTOR.
HARRY L. JOHNSON
BY
ATTORNEY

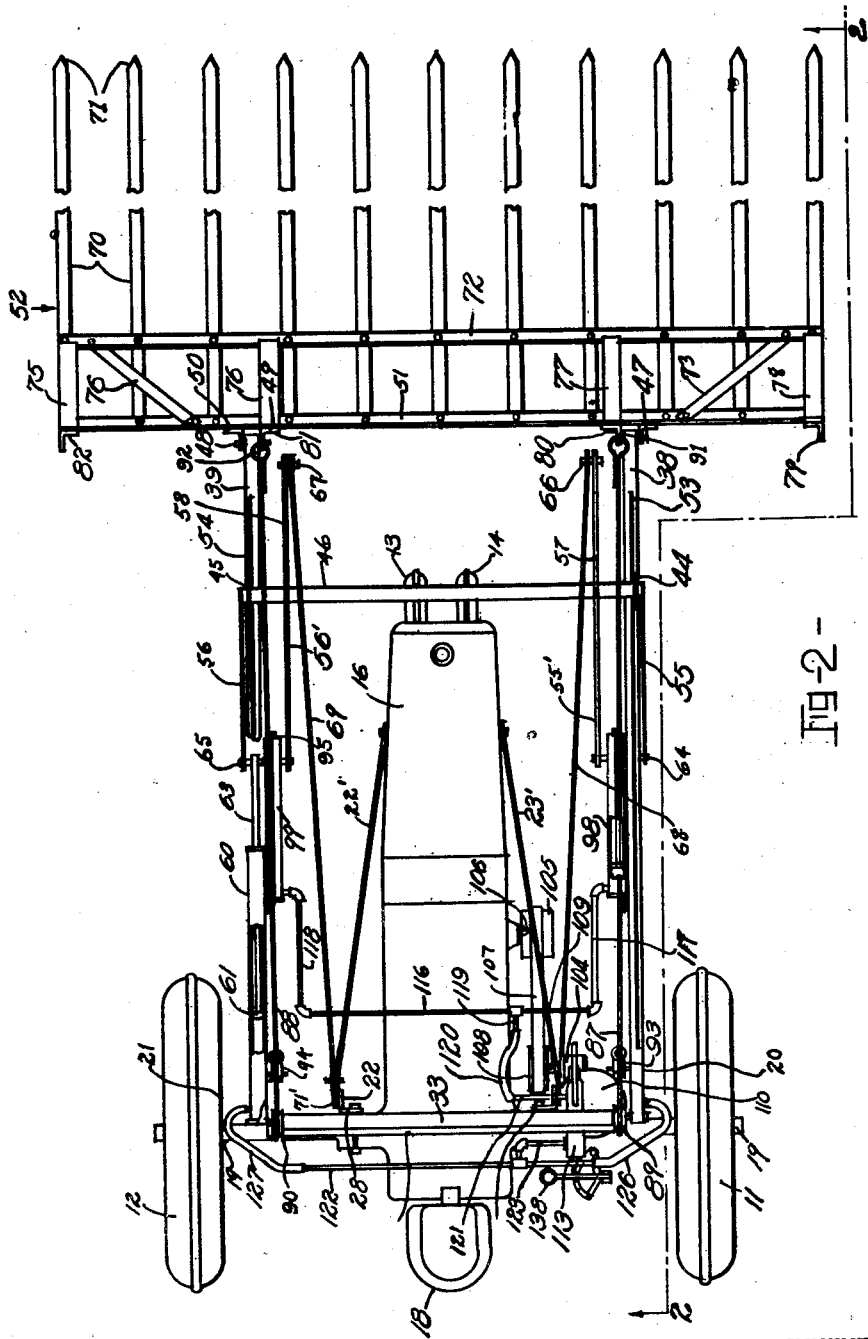

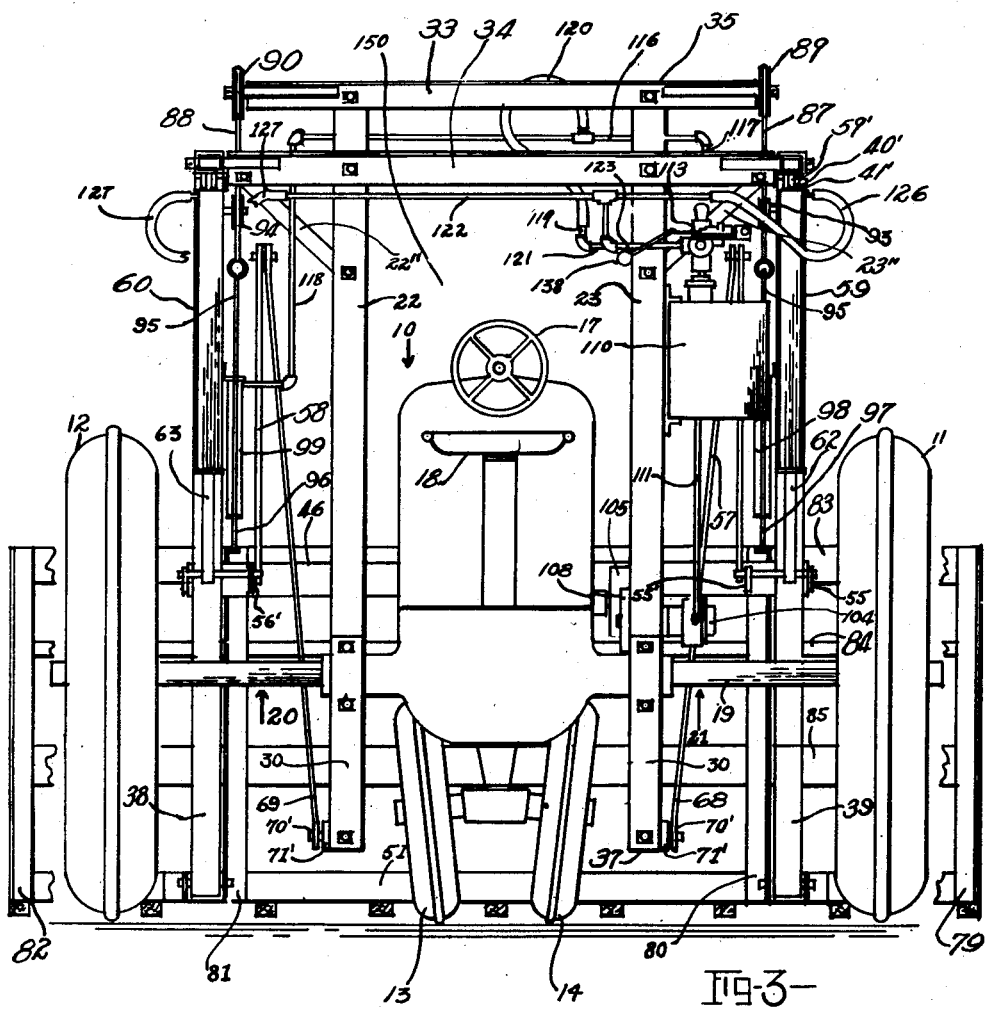

Sept. 16, 1947.   H. L. JOHNSON   2,427,461
HYDRAULIC TRACTOR LOADER
Filed March 13, 1945   5 Sheets-Sheet 4
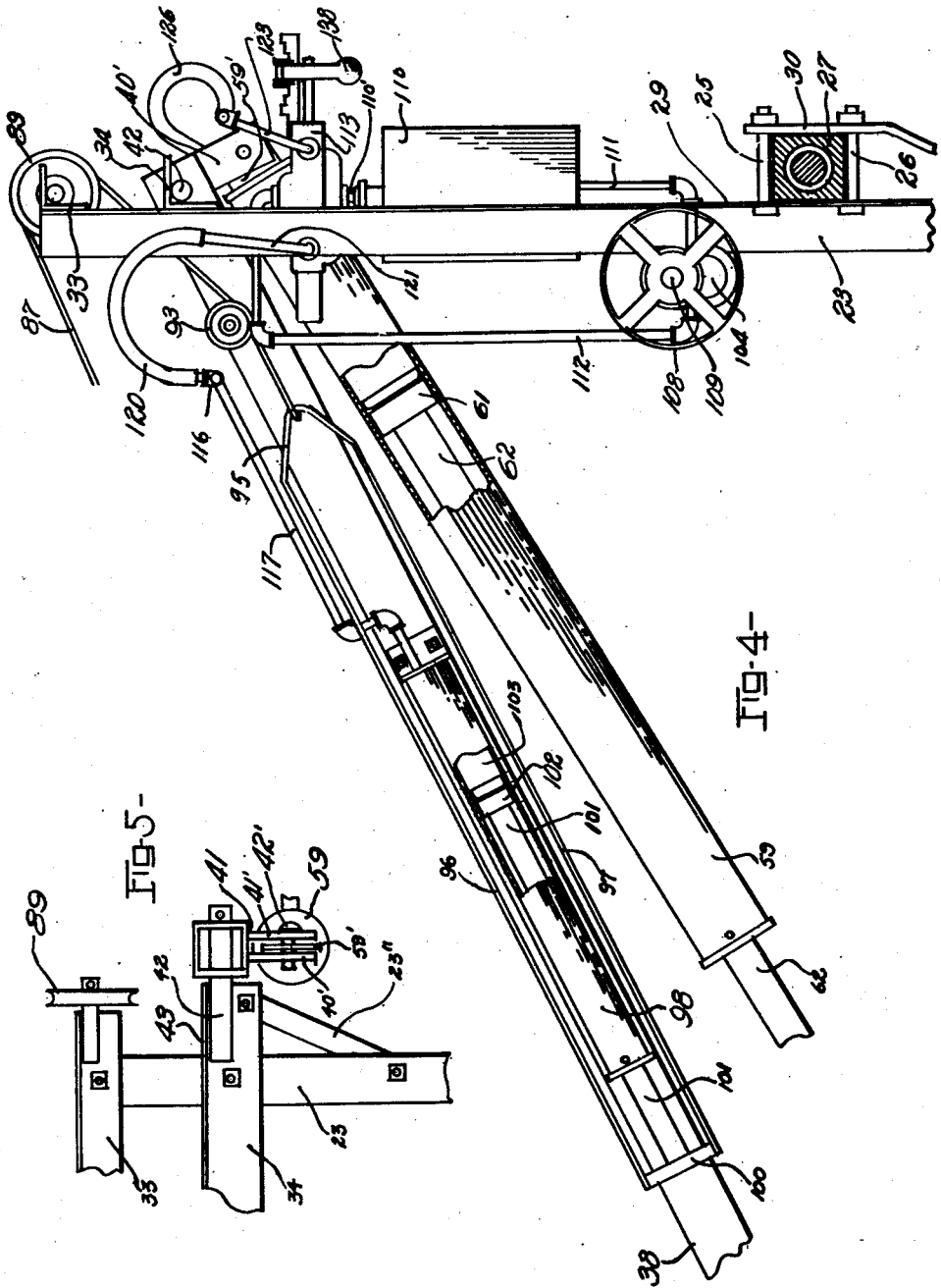
INVENTOR.
HARRY L JOHNSON
BY
ATTORNEY

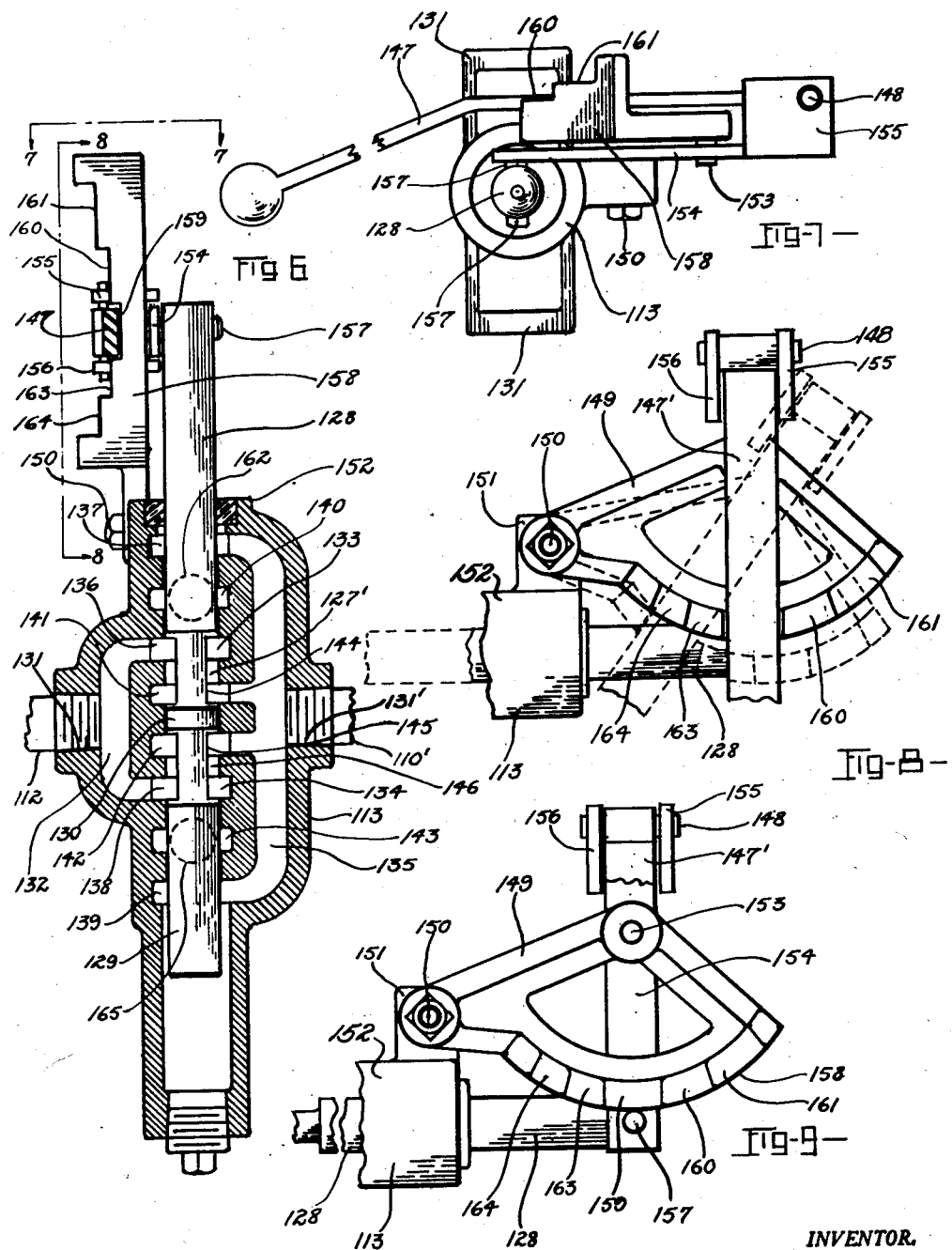

Patented Sept. 16, 1947

2,427,461

UNITED STATES PATENT OFFICE 2,427,461

HYDRAULIC TRACTOR LOADER

Harry L. Johnson, Minneapolis, Minn.

Application March 13, 1945, Serial No. 582,435

13 Claims. (Cl. 214—140)

My invention relates to hydraulic tractor loaders and has for its object to provide, in combination with the features of a farm tractor, mechanism adapted to be conveniently and quickly attached to the tractor and detached therefrom, whereby when the same is attached, the tractor may be driven over the ground with a sweep or pick-up device moving ahead substantially level with the ground and the material then picked up may be hoisted by operation of a hydraulic cylinder connected at its upper end adjacent the upper end of the frame, and thereafter by other cylinder means the sweep may be tilted to drop its picked-up load.

Numerous attempts have heretofore been made to obtain a pick-up and loading device attached to a tractor or similar motor vehicle. Such devices have in some instances been used, but have defects and difficulties connected with their operation which seriously detract from the efficiency and usability and greatly increase the cost of their operation. Some of these defects are as follows:

An effective sweep or pick-up member, especially for picking up and loading hay, grain bundles and the like, must to be efficient be quite wide— very much wider than the normal setting of the tractor wheels. From the very nature of the pick-up operation this sweep is likely to be loaded more heavily on one side than the other with a tendency for the sweep to tip as it is lifted up and to put torsional strains on the supporting members, which result in bending and breakage of the parts and in some instances in the upsetting or tipping over of the tractor. This is particularly marked where, as in some types of devices for the purposes named, the cylinder is connected to the lower part of the frame and has its piston extending to the sweep itself, thus resulting in a very long piston and piston rod, all of which increases the difficulty and disadvantage of the lateral tip of the sweep.

Certain of these hydraulic lifting devices also arrange their cylinders and the supporting radius bars running to the sweep outside of the tractor wheels. In such cases the tractor wheels are necessarily limited in position to the narrowest width between them, whereas, as tractors are now built and furnished to the public, the wheels may be quite widely extended. When they are in their narrowest position, an unbalanced load on the sweep, particularly with the torsional lifting swing of the long lifting cylinders and piston rods, is extremely likely to tip the tractor over, which results not only in a great deal of loss of time but in serious expense because of breakage of the parts.

Other points of difficulty have been ineffective means for maintaining the sweep level while it is being elevated, also too great complication in such means, the use of only one cylinder for tilting the sweep operative from the center of the machine, the use of long and complicated connections from the motor to the pump for maintaining oil pressure, and the corresponding use of very long supply tubes with the resulting loss and dissipation of pressure.

I have discovered that a highly effective arrangement of parts to be combined with a tractor results from three simple but important and far reaching changes. First, to provide an upright frame removably attached to the axle and extending vertically in front thereof with a part extending well below the axle, and to connect such lowered part of the frame, by means of symmetrically positioned long and strong links, with a lever system rigidly secured to a transverse rotatable shaft mounted upon the radius arms of the lifting device, and to mount the lifting cylinder with its rear end pivoted adjacent the top of the frame and connected with one arm of the lever system, whereby a relatively short cylinder and piston will lift the radius arms and the attached load-carrying sweep with no possibility of lateral tipping thereof, because of the transverse shaft supported by brackets on each of the radius arms.

Second, by providing a pair of cables connected to the upright arms of the sweep in widely spaced relation on each side thereof and operating these cables by short hydraulic cylinders carried by the radius arms and thus holding the load-carrying part of the sweep in horizontal position with uniform tension on both cables at both sides thereof.

Third, by pivoting the radius arms to the upright frame members near the upper ends thereof and pivoting the lifting cylinders to an offset bracket arm so that, as the radius arms and the sweep are being lifted, the cables which support the sweep in its load-lifting position and run over pulleys on the upper end of the frame, have their connections with the cable-operating cylinders progressively shortened as the parts are lifted, thus automatically maintaining the load-lifting part of the sweep in its horizontal position.

Other important changes which increase the efficiency of and avoid difficulties with the lifting mechanism are the location of the oil pump, supported upon and just in front of the vertical frame, for short direct drive from the belt of the tractor motor, the location of the oil piping and the oil storage tank at one side but along the vertical frame, and the piping and tubing for the two sets of cylinders also located across the frame with very short tubing, all these parts short and direct, and an unusually dependable novel valve for controlling the flow of oil located close to the operator and with its handle in convenient position to be manipulated by him.

It is a principal object of my invention, therefore, to provide, in combination with a tractor of standard make, a vertical frame removably secured to and in front of the axle of the tractor, and comprising vertical members having parts extending above the tractor axle for some considerable distance and other parts extending below the axle to points near the lower portion of the tractor wheels, and to mount a lifting mechanism, including a pair of links pivoted to the downwardly extended parts of the frame and to the piston rod of a hydraulic cylinder, which is pivoted at its rear end to a point near the top of the frame, for effecting the lifting action.

It is a further object of my invention to provide radius arms with a sweep pivotally connected thereto, said arms pivoted at their upper ends upon the upper portion of the frame and having upwardly extended brackets on which is mounted a transverse shaft with sets of lever arms fast on the shaft, the sets pivotally connected respectively with a link pivoted to the downwardly extending part of the frame and with the piston rods of the hydraulic cylinders.

It is a further object of my invention to provide cylinders mounted on the radius arms and having cable connections to uprights on the sweep, together with means for supplying oil under pressure to said cylinders to hold the sweep with its load-carrying portions in horizontal position so that they may tip downwardly for discharging when the oil pressure is withdrawn from the cylinders.

It is a further object of my invention to pivot the radius arms to the portion of the frame extending above the axle of the structure at a point near the top thereof and to pivot the lifting cylinders to bracket arms connected with and extending at right angles to the radius arms from the point of pivoting thereof, so that, in combination with the lever system provided for elevating, the lifting cylinders and radius arms are separated as the sweep is raised, and the effective lengths of the sweep-supporting cables between their connection with the arms of the sweep and the axis of their supporting pulley will be automatically lengthened to maintain the supporting parts of the sweep in horizontal position.

It is a further object of my invention to mount the frame inside of the rear wheels so the rear tractor wheels may be extended laterally to give a wide tractor support of the entire lifting mechanism.

It is a further object of my invention to mount an oil pump upon the inside of the vertical frame and connected with said frame so the pump may be driven directly from the pulley shaft of the tractor.

It is a further object of my invention to carry piping from the oil pump to the bottom of a reservoir tank mounted upon the frame in alignment with the oil pump to deliver oil thereto and to carry piping from the oil pump directly to a valve box having means including short flexible tube sections for delivering oil to the two sets of cylinders.

It is a further object of my invention to mount fixed transverse sets of piping connected with the lifting cylinders and the sweep-supporting cylinders respectively and to connect this piping with the valve box through flexible tubing which permits the piping to oscillate with the parts supporting it and presents the oil to the cylinders over a short and certain path.

It is a further and important object of my invention to provide a valve box and valve operator whereby movements of a pivoted lever are effective to move a plunger valve in a straight line, and the plunger has piston parts for controlling flow of oil in its different operative positions, and the lever cooperates with stops on the stand to hold the plunger set in any selected one of said positions.

The full objects and advantages of my invention will be given in detail in connection with the appended specification which describes the invention and its uses, and the novel features thereof by which the above-noted improvements and advantageous results are obtained will be particularly pointed out in the claims.

In the drawings illustrating an application of my invention in one of its forms:

Fig. 1 is a side elevation view of a tractor taken inside of one of the tractor wheels as on line 2—2 of Fig. 2, with the lifting and loading mechanism shown in its elevated position in dotted lines.

Fig. 2 is a plan view of my invention as the same is applied to a tractor supporting it.

Fig. 3 is an end elevation view of the tra... taken from the rear of the machine.

Fig. 4 is an enlarged side elevation view of some of the parts viewed from the side opposite that of Fig. 1 with some parts broken away and in section and showing features of the pumping system.

Fig. 5 is an enlarged fragmentary detail end view taken substantially on line 5—5 of Fig. 1 and showing the pivotal connection of the radius arms and the lifting cylinders respectively with the main upright frame.

Fig. 6 is a sectional view in enlarged plan of the valve box and valve control mechanism.

Fig. 7 is an end elevation view of the valve lever parts for shifting the valve as desired, taken on line 7—7 of Fig. 6.

Fig. 8 is a top plan view taken on line 8—8 of Fig. 6.

Fig. 9 is a plan view of the parts shown in Fig. 8 with the operating lever removed.

As illustrated, a tractor 10, of standard construction, has rear driving wheels 11 and 12 and front steering wheels 13 and 14 tilted toward each other, as shown in Fig. 3. The frame of the tractor is indicated generally at 15, the motor at 16, steering wheel at 17, driver's seat at 18, and rear axle at 19. All of these are known parts of a farm tractor of a generally standarized construction. It will be noted that the axle 19 has been extended laterally, as indicated at 20 and 21, giving relatively a wide spread to the rear wheel support of the tractor and the parts connected with it. This extension of the rear axle to widen the base of support of the tractor is standard construction in farm tractors and can be used in connection with my loader attachment because of the novel features of my invention which make it practicable.

Referring to Figs. 1 and 3 I provide a frame comprising a pair of uprights 22 and 23 which are secured to the squared axle frame 27 of the tractor, see Figs. 1 and 4, by means of clamping bolts 25 and 26 which are exterior to the square portion thereof and extend through flange 28, Fig. 2, of angle iron upright 22, and equally through flange 29 of angle iron upright 23, Fig. 4, and through an outer brace member 30 which has a part 31 bolted at 32 to the lower part of flange member 29, and likewise to the lower part of flange member 28. Braces 22' and 23', Figs. 1 and 2, extend angularly from the tractor frame, to which they are secured at their lower ends, to the uprights 22 and 23 to which they are secured at their upper ends.

The above described frame elements at their lower ends comprise the only points of attachment of my lifting mechanism to the tractor. Making that attachment is done very simply and easily and can be accomplished in about fifteen minutes of time. This makes attachment and removal of the lifting mechanism to and from the tractor not only easy, yet in a manner which firmly holds the uprights 22 and 23 in fixed vertical and parallel position, and also in fixed spaced relation to and at the front of the axle of the tractor.

The frame is completed by bolting a pair of transverse angles 33 and 34 to the uprights 22 and 23, Figs. 3 and 4, at the extreme upper ends thereof and at a point somewhat below the upper end. There is thus an upper part of the frame extending to a point 35 a substantial distance above the axle of the tractor and a second part of the frame 36 extending to a point indicated at 37 which is a substantial distance below the tractor axle. Braces 22" and 23" extend from the respective uprights 22 and 23, Fig. 2, to points near the outer ends of cross bar 34.

It will be noted also that the frame is mounted in front of the tractor axle with the parts of the frame above the axle and below the transverse member 34 spaced apart and open, giving the operator free access to the steering wheel 17 and an unobstructed view ahead across the top of the tractor, as best shown in Fig. 3 and indicated thereon at 150.

The lifting mechanism comprises two identical radius arms 38 and 39, Fig. 2, each of which is pivoted as at 40 through a squared end 41, Fig. 5, to a shaft 42 rigidly secured by welding or other suitable means to an extension 43 of the transverse member 34. Since this construction is identically the same as to each of the two arms 38 and 39, the description here given for arm 38 will apply equally to radius arm 39.

Upon each of radius arms 38 and 39 is formed upstanding brackets 44 and 45, Figs. 1 and 2. Between the brackets 44 and 45 and journaled to rotate in bearings in the brackets at each end, extends a shaft 46, Figs. 2 and 3, which holds the radius arms spaced in parallel relation.

The radius arms are also held spaced and parallel by being pivoted at 47 and 48 between sets of ears 49 and 50, secured to a transverse angle bar 51 which forms the main back support of a sweep or pick-up lifting member, indicated generally by the numeral 52. The sweep 52 will be hereinafter described more in detail. Truss rods 53 and 54 are secured at their ends to the respective radius arms 38 and 39 and are secured intermediate their ends to the sides of the brackets 44 and 45 beneath shaft 46, as indicated in Fig. 1.

Upon the ends of the shaft 46 rigidly connected thereto outside of brackets 44 and 45 are a pair of arms 55 and 56, Figs. 1 and 2. Also rigidly connected with shaft 46 at points substantially spaced inside of brackets 44 and 45 are two additional arms 55' and 56' which are held parallel and spaced so as to straddle the radius arms 38 and 39, and are connected to arms 55 and 56 at their ends through pivots 64 and 65. Rigidly connected to shaft 46 in the planes of arms 55' and 56' and extending at a broadly obtuse angle thereto are other arms 57 and 58. As clearly shown in Figs. 1 and 2, these arms are parallel, and since both sets of arms are rigidly connected to the single shaft 46, when either set is moved, the other set must be moved in unison therewith, a matter of great importance in the operation of my lifting device, as will hereinafter appear.

The power for moving the radius arms 38 and 39 and with it the lifting sweep 52 is derived from two hydraulic cylinders 59 and 60, Figs. 1, 2, 4 and 5. These cylinders have fast on their ends a bar extension 59', which comes between arms 40' and 41' rigidly secured to the squared end 41 of the radius arms. A pin 42' extends through the extension 59' and the arms 40' and 41' straddle it, and this pivotally supports the upper end of cylinder 59, and in the same manner the upper end of cylinder 60. Pistons 61 in the cylinders 59 and 60 and piston rods 62 and 63, Figs. 1 and 2, are pivotally connected at 64 and 65 with the outer ends of lever arms 55' and 56'. Thus the radius arms 38 and 39 are pivoted directly to the transverse frame member 34 on the uprights 22 and 23, while the lifting cylinders 59 and 60 are pivoted to lateral frame extensions from the pivoted ends of the radius arms 38 and 39.

As clearly shown in Figs. 2 and 3, where the radius arm 39 is broken away, the cylinders 59 and 60 lie directly underneath the radius arms 38 and 39, respectively. And since the respective radius arms and cylinders are each pivoted at their rear ends, they are capable of swinging on their respective pivots so as to go from a substantially parallel position of full lines at Fig. 1 to the diverging partially elevated positions of Fig. 4, or the fully elevated positions shown in dotted lines of Fig. 1.

Pivoted at 66 and 67 to the ends of levers 57 and 58 are long fulcrum links 68 and 69 preferably formed of iron pipe which is sufficiently strong for the purpose. The fulcrum links 68 and 69 are each pivoted at 70 to a bracket 71 fast on the bottom of the downward extension 36 of the frame pieces 22 and 23 (Fig. 3).

The operation of this arrangement will be quite clear from the description of the manner of connection and relationship of the several parts. The arms 55, 55', 57 and 56, 56', 58, in connection with the transverse shaft 46 to which they are rigidly mounted and with which they oscillate back and forth, constitute a lever system. The thrust of the piston rods 62 of the respective hydraulic cylinders 59 and 60 at 64 and 65 is transmitted to this lever system so as to rock the shaft 46 and cause the ends of lever arms 57 and 58 to thrust upon the fulcrum links 68 and 69 with the result that the parts take the position in dotted lines of Fig. 1.

In this position the radius arms 38 and 39 and the attached sweep 52, with whatever load may be upon it, has been lifted from the lowered position close to the ground, shown in full lines in Figs. 1 and 3, to the elevated position shown in dotted lines thereon.

What is referred to here as the sweep 52 may be any form of pick-up member adapted to move in front of the tractor in a plane close to the ground or elevated therefrom as the conditions may require. In general the sweep will include a series of parallel forwardly extending tines or pick-up fingers, although instead of such fingers the solid bottom of a scoop may be employed for elevating and loading material such as earth, snow or the like. The form shown in the drawings is exemplary, but is specifically adapted for the pick-up of hay.

In this form, referring to Fig. 2, the transverse bar 51, which is the base of the sweep, has secured thereto a series of tines or pick-up fingers 70 which are formed with pointed ends, as indicated at 71. At second transverse bar 72 is bolted to the tines at points removed from the transverse bar 51 and parallel to it. Short diagonal braces 73 and 74 are secured to both transverse bars 51 and 72. Diagonal braces 75, 76, 77 and 78 run from points near the tops of uprights 79, 80, 81 and 82. These uprights are secured at their lower ends to the transverse supporting bar 51, and the braces 75, 76, 77 and 78 are connected at their lower ends to the transverse bar 72. To the uprights 79, 80, 81 and 82 are secured a transverse top rail 83 and intermediate transverse rails 84 and 85.

This arrangement, as above outlined, comprises the sweep or pick-up device, wherein the rear wall above described extends normally at right angles and is rigidly secured to the frame work of the pick-up fingers 70, and the whole assemblage, as heretofore noted, is pivoted at 47 and 48 to the ends of the radius arms 38 and 39 at the bottoms of the upright members 80 and 81, and thus is capable of oscillating from the ends of said members.

Cables 87 and 88 run over pulleys 89 and 90 fast on the ends of top transverse frame bar 33, Figs. 3 and 5. These cables connect at 91 and 92 near the upper ends of uprights 80 and 81. The cables 87 and 88, after passing over the pulleys 89 and 90, go under small pulleys 93 and 94 mounted on the sides of the radius arms 38 and 39, Fig. 2, and connect with a yoke member 95, Fig. 4. This yoke member has long arms 96 and 97 which come on either side of short cylinders 98 and 99, Figs. 2 and 4, and connect with a cross member 100, Fig. 4, directly in front of the cylinders 98 and 99. The cross member 100 is secured to the end of piston rod 101, Fig. 4, which is connected with piston 102 on the inside of each of the cylinders 98 and 99. When oil under pressure is introduced into the interior 103 of the respective cylinders 98 and 99 back of their pistons 102, the cords 87 and 88 are caused to pull on the uprights 80 and 81 of the sweep, thus holding the same in position with the pick-up fingers 70 horizontal.

The means for supplying oil to the two sets of cylinders is simple and effective and is best shown in Figs. 1, 3 and 4. A gear pump 104 is secured to the inside of upright 23 close to the tractor axle. It is driven from a pulley 105 fast on the pulley shaft 106 of the tractor, which, through a belt 107 running over a pulley 108 fast on the gear pump shaft 109, drives the pump directly from the tractor motor.

A supply tank 110, Fig. 4, for holding a sufficient amount of oil pumped to the cylinders is connected by a pipe 111 which runs directly to the intake side of the gear pump 104. A pipe 112 leads from pump 104 to the valve box 113 which controls flow of oil to the cylinders. The tank 110 must hold enough oil to supply all four cylinders.

A transverse feed pipe 116, Fig. 2, is connected by branch pipes 117 and 118 which lead to the cylinders 98 and 99 and is supported to oscillate up and down with said cylinders which are attached to the radius arms 38 and 39. A short pipe section 119 is connected with a flexible hose 120 to a pipe 121 leading to the valve box 113, Fig. 2 and Fig. 4.

Similarly a transverse pipe 122 is connected through a branch pipe 123 with the valve box 113. The rigid transverse pipe 122 is connected by flexible tubing sections 126 and 127 with the ends of lifting cylinders 59 and 60, as best shown in Fig. 2.

It follows that when oil is admitted from valve box 113 through connections 121, 120 and 119 to the pipe 116 it will be simultaneously distributed to the two cylinders 98 and 99, and when oil is admitted from the valve box 113 through connections 123 to pipe 122, it will be simultaneously distributed to the two lifting cylinders 58 and 59.

Details of the valve box 113, valve and valve control are shown in Figs. 6, 7, 8 and 9. The valve box proper 113 embodies an inner valve chamber 127' in which operates a specially constructed valve piston. This valve member, having reference to Fig. 6, comprises a valve plunger 128 having an inner portion 129. Both the main part 128 and the inner part 129 are adapted to operate within the valve chamber 127 in sealing relation thereto and to parts thereof. The valve plunger 128 also has a central part 130 which operates in sealing relation within parts of the valve chamber proper.

The valve box 113 includes an opening 131 adapted to communicate with the pressure side of the pump-line 112 and an opening on the opposite side 131' adapted to communicate with a return pipe line 110', which delivers the oil back into the oil-holding reservoir 110.

A two-way pressure manifold 132 connects with the pressure inlet opening 131 and leads to annular chambers 133 and 134 which surround the valve chamber 127'. The outlet opening 131' communicates with a four-way oil outlet manifold 135 which communicates respectively with annular chambers 136, 137, 138 and 139 about the main valve chamber 127. In addition there are annular chambers 140, 141, 142, and 143 which cooperate with the valve sections on the plunger valve member 128.

These valve sections are formed by reduced sections 144 and 145 of the valve plunger 128 located on either side of the central valve member 130 and of a length sufficient to span any two adjacent chambers. As in Fig. 6, reduced portion 145 spans the two annular chambers 134 and 142, leaving them connected by the annular passageway 146 formed about the reduced section 145 of the valve plunger 128 between the parts of the valve 130 and 129. Similarly, in the position of Fig. 6 there is connection made between annular passages 133 and 141 at reduced section 144.

This is the neutral positon in which pressure oil entering manifold 132 flows through chambers 138, 142, 136, 141, directly to manifold 135 and thence through passageway 110' back to the oil container 110. In this position oil which has been delivered under pressure to the respective sets of cylinders 59 and 60, and 98 and 99 is held blocked in these cylinders and operative to hold the pistons in the cylinders and the parts connected therewith in a previously set fixed position.

The valve operator, that is, the member for sliding the valve plunger 128, 129 and 130 along the valve chamber 127, comprises a lever 147 pivoted at 148 to a rocking holder 149, which in turn is pivoted at 150 to an outwardly extended arm 151 fast on the end 152 of valve box 113. As best shown in Fig. 9, the member 149 is pivoted at 153 to a rocking arm 154 which is co-extensive with the shank 147' of lever 147, and which has secured thereto upstanding ears 155 and 156 to and between which the lever 147 is pivoted.

This leaves the lever 147 free to be swung outwardly on its pivot 148 and to swing it and the bar 154 at right angles to its outward movement upon the fulcrum pivot 153.

The bar 154 is pivotally connected at 157 with the outwardly extended end of the valve plunger 128. Hence when the lever arm 147 is lifted on its end pivot 148 and swung either to right or left, the bar 154 will be correspondingly swung and, through its pivot connection 157 with the valve plunger 128, will move it either to right or left in a straight line, this straight line movement being made possible by the pivotal connection 150 of the rocking holder 149.

As best shown in Figs. 6 and 9 the rocking holder 149 is provided with an arcuate portion 158 upon the upper face of which are a series of supporting plateaus and lateral stops. The central plateau 159 holds the lever 147 in neutral position, with the valve in the position of Fig. 6. Plateaus and stops 160 and 161 are the respective positions for sliding the valve to the right for controlling oil delivery to and from the lifting cylinders 59 and 60. The position of 160 shuts off pressure oil from the return pipe 110' and effects delivery of pressure oil to the pipe system 122, 123, 126 and 127 for operating the lifting cylinders 59 and 60 while blocking movement of pressure oil to the oil return pipe 110. Further movement of the valve to position 161 will direct pressure oil back to the return pipe 110' and will release the oil from cylinders 59 and 60 to permit the radius arms and sweep to return to their lowered position.

The inlet and outlet opening from valve box 113 to pipe 123 is indicated in dotted lines at 162 of Fig. 6. Similarly the positions 163 and 164 on the opposite side of the neutral position 159 will operate to apply and release pressure to the sweep-controlling cylinders 98 and 99 through the pipes 121, 119, 120, 117 and 118, the outlet to pipe 121 being indicated in dotted lines at 165 in Fig. 6.

It will be noted that after pressure has been applied to either set of cylinders, movement either to neutral position or to operative position of the other set will block flow of oil from the set having the oil pressure therein, and it will remain blocked until the valve plunger 128 has been pushed to one or the other of the extreme position for releasing the oil from one or the other set of cylinders. Thus, the oil can not be released from both sets simultaneously, which is an essential for operation of this device.

When, for example, the sweep and its load have been lifted to the elevated position, it is essential that the sweep-controlling cylinders have their oil released to permit dumping of the load and then have their oil pressure restored to bring the sweep into pick-up position before any release of pressure from the lifting cylinders. Conversely, also when the pressure has been introduced to the sweep-controlling cylinders to hold the pick-up bars horizontal, it is essential that they remain so held while the valve is moved to release or to restore pressure to the lifting cylinders.

The operation of the two sets of cylinders, the one for lifting the radius arms and the attached load, and the one for holding up the sweep and permitting its reversal of position for dumping, thus are carried on entirely independently. The radius arms and the load may be lifted to the dotted line position of Fig. 1 and will remain in that position until the valve operating lever has been taken to position 161. So by swinging the handle or lever 147 in the opposite direction across the inoperative neutral position 159 to position 164, the lifting cylinder oil will be trapped so the lifting cylinders will continue to hold it up and oil will be released from the sweep-controlling cylinders permitting them to take the dumping position.

The fingers or tines 70 will drop to vertical and the load upon them be dumped. Then by going back to the position 163 pressure oil communication will be established and the sweep brought back to the pick-up position of Fig. 1. Following that, moving the lever across the neutral position and the 160 position to the 161 position will position it, so the valve will release the radius arms and supported sweep and they will be gradually lowered to the full line or pick-up position, making everything ready for another pick up, when the lever will be returned to neutral position 159. These operations may be repeated indefinitely.

In operation, the device which forms the present invention functions in the following manner. With the parts positioned as shown in the full lines of the several views of the drawings, when the operator wishes to pick up a load, such as a load of hay or the like, and with the lever 147 in the neutral position 159 as shown in Fig. 6, wherein the lever is extending in the direction of the reader. Lever 147 is moved to plateau 163, which, as indicated in Figs. 8 and 9 causes a simultaneous movement of valve plunger 128 and its co-acting parts in the same direction, so that the upper part of valve plunger 128 is moved downwardly to close communication between manifold 132 and chamber 133 and open communication between manifold 132 and chambers 134, 143. This movement closes all communication between manifolds 132 and 135 so that oil, being pumped under pressure from pump 104, passes through pipe 112, inlet opening 131, manifold 132 to outlet 165, from whence it passes through conduit 121 and its co-operating connections to the sweep controlling cylinders 98 and 99. As pressure is developed in cylinders 98 and 99, through the yoke connections, cables 87 and 88 have a force exerted upon them which is communicated to members 80 and 81 of sweep 52 to cause sweep 52 and tines 70 to be firmly held in a horizontal position. When the load has been placed on the sweep as by driving the tractor forward to push the sweep under the load, the sweep is now rigid and the next step is to elevate the sweep either to a small extent to transport the load, or to its full extent to elevate the load onto a higher plane. To elevate the load, lever 147 is moved across neutral position 159 to plateau 160. As previously explained, valve plunger 128 is moved in unison and in the same direction as lever 147 and therefore under these conditions, portion 129 will seal the oil present in opening 165 and conduit 121 so that the sweep control cylinders 98 and 99 are maintained under pressure, and as the valve plunger 128 is moved upwardly, communication is opened between manifold 132 and chambers 133 and 140 to permit oil under pressure being delivered by pump 104 to pass through pipe 112, manifold 132, to opening 162 from whence it passes through connection 123 and its co-acting parts to the cylinders 59 and 60 which provide for the elevation of radius arms 38 and 39. As pressure is developed in cylinders 59 and 60, piston rods 62 and 63 are moved downwardly and, as shown in Figs. 1 and 2, levers 55, 55' and 56, 56' are moved on brackets 44 and 45 in a counter-clockwise direction. Through the connection provided by rod 46, levers 57 and 58 are caused to rotate on pivots 66 and 67 to move links 68 and 69 in a counter-clockwise direction on pivots 70' with the fulcrum being located at brackets 44 and 45 to cause the radius arms 38 and 39 to be rotated on their pivotal connections on transverse member 34. When the load has been elevated to the desired extent, lever 147 is moved to neutral position 159 to seal the oil under pressure in all cylinders. To dump the sweep while in its elevated position, lever 147 is moved to plateau 164 which causes plunger 128 to open communication between chambers 143 and 139 to permit oil to flow from the opening 165 through the outlet manifold 135 whence the pressure in cylinders 98 and 99 will diminish and permit the sweep to rotate on its pivots 47 and 48 until the tines 70 are in a vertical position which will cause dumping of the load. To bring the sweep back to its normal rigid position, lever 147 is moved to plateau 163 to establish communication in the manner previously described. To lower the sweep, lever 147 is then moved to plateau 161 which opens communication between opening 162 and chambers 140 and 137 to the outlet manifold 135 whereupon pressure in cylinders 59 and 60 will be reduced and the sweep lowered to ground level. As previously explained, the blocking effect of valve plunger 128 will permit pressure to be maintained in either or both of the two sets of cylinders so that when the sweep is in the elevated position shown by the dotted lines of Fig. 1, pressure is being maintained on both sets of cylinders.

The advantages of my invention are evident from the foregoing description. It will be observed from Fig. 3 that the operator seated upon the tractor seat 18 has a wholly unobstructed view ahead and that the valve handle 147 is positioned at his right hand for ready and convenient operation of the valves. The standard tractor-operating levers are not shown but are also located in convenient position for operation.

The lift or swing of the radius arms and supported parts from the ground position to the elevated (dotted line) position takes place without twisting or upsetting strain uniformly, because of the heavy transverse shaft 46 which ties the two parts at the sides together to move in unison throughout their travel from their lowered to their elevated position, regardless of whether or not the respective cylinders are applying the lifting pressure uniformly.

The mounting of the lifting parts on the inside of the tractor wheels permitting wide separation of the tractor wheels, produces a very effective safeguard against any tendency to upset the tractor. Also the lifting cylinders themselves do not have any direct function in effecting lifting of the radius arms and the attached loading. This lifting effect is produced entirely through the swing of the lever system on the shaft 46 operating through the fulcrum bars 68 so that the cylinders merely have a direct straight line thrust on the pistons and piston rods. The whole lifting effect is thus brought about by the swing of the lever system attached to the fulcrum bars.

The two sets of cylinders are small in both their diameters and lengths, requiring less oil for operation and substantially reducing weight. Also the location of the cylinders is such that their operative effect reduces length of piston movement, greatly reduces the lengths of oil lines, and produces a uniform application of power to the lever systems.

The valve structure for controlling the oil is extraordinarily simple and yet in a high degree effective. All controls are effected by movements of a single sliding valve member. Operation of this single member makes possible introduction of pressure oil to both sets of cylinders independently, establishment of neutral circulation of oil independently of pressure maintained in either or both cylinders, and release of oil pressure from either cylinder independently of either other cylinder.

I claim:

1. A tractor lifting mechanism, comprising a vertical frame member removably secured to and in front of the rear axle of the tractor, said frame including an extended part rising vertically above the horizontal plane of the axle and a second part extending below the rear axle to a point close to the ground-contacting surface of the tractor wheels, radius arms pivoted to the upwardly extending part of the frame near the top thereof, a load-carrying sweep supported upon the outer ends of the radius arms, and means for swinging said radius arms and load-supporting member to an elevated position including a hydraulic cylinder and a lever system having fulcrum connection with the bottom of the lower part of the frame.

2. A tractor lifting mechanism, comprising a vertical frame member removably secured to and in front of the rear axle of the tractor, said frame including an extending part rising vertically above the horizontal plane of the axle and a second part extending below the rear axle to a point close to the ground-contacting surface of the tractor wheels, radius arms pivoted to the upwardly extending part of the frame near the top thereof, a load-carrying sweep supported upon the outer ends of the radius arms, a lever system mounted on the radius arms, a fulcrum link connected at one end with the lever system and at the other end with the lower part of the frame, and a hydraulic cylinder having its piston rod connected with a member of the lever system for operating the same to cause the radius arms and the load-carrying sweep thereon to be moved from the lowered to the elevated position.

3. A tractor lifting mechanism, comprising a frame member removably secured to the rear axle of the tractor and having a part extending upwardly therefrom, radius arms pivoted to points near the top of said upwardly extending part, a load-carrying sweep pivotally supported upon the outer ends of the radius arms, means including a hydraulic cylinder pivoted at its rear end to the upwardly extending part of the frame near its top, and a lever system on the radius arms and connected with the cylinder to be operated thereby including a fulcrum link pivoted at one end to the lower end of the frame member for swinging said radius arms and load-carrying member to an elevated position.

4. A tractor lifting mechanism, comprising a vertical frame removably secured to the rear axle of a tractor, radius arms pivotally secured at points near the top of said frame, supporting members each secured to and extending outwardly from a radius arm adjacent its pivotal connection with the frame, a load-carrying sweep pivotally supported upon the outer ends of the radius arms, a pair of lifting cylinders each pivotally connected to a respective one of said supporting members and movable on said pivots independently of the movement of the radius arms, means operated by the hydraulic cylinders and having connection with the radius arms for swinging the radius arms and load-carrying member to an elevated position, and a pair of cords and means for operating them for holding the load-carrying part of the sweep horizontal, the arrangement of the cords in relation to the pivots of the radius arms and of the cylinders being such that as the radius arms are raised the effective supporting lengths of the cords will be shortened and thus effect a holding of the load-carrying parts of the sweep horizontal while it is being elevated.

5. A tractor lifting mechanism, comprising a frame having an upstanding part, radius arms pivotally secured at points near the top of said part, a pair of lifting cylinders each related to a respective one of the radius arms and pivoted at their upper ends in relation thereto at points spaced from the under side of said radius arms, means connecting the piston rods of the hydraulic cylinders with the radius arms and with the frame to lift the radius arms, a pair of hydraulic cylinders on the respective radius arms, a sweep pivoted to the front of the radius arms having a load-carrying part, cables connecting the sweep and the pistons of the last-named hydraulic cylinders over supporting pulleys, means for maintaining oil under pressure in said last-named cylinder to hold the load-carrying part horizontal at the ground, the arrangement of the cables in relation to the pivots of the radius arms and of the lifting cylinders being such that as the radius arms are raised the effective supporting lengths of the cables from the pulleys to the sweep will be increased and thus effect a a holding of the load-carrying part of the sweep horizontal while it is being elevated.

6. In a tractor lifting mechanism, a pivoted lifting member with a load-carrying part, a hydraulic cylinder for effecting the lifting and lowering of said member, a second hydraulic cylinder for controlling operation of the part, an oil pump, a valve chamber having connection with the pump and with the two cylinders, a single endwise movable piston valve in said chamber, said valve and the chamber having complementary passageways such that when the valve is positioned centrally pressure oil will circulate, when the valve is positioned laterally at one or the other side of said central position pressure oil will go to one or the other only of said cylinders, and when the valve is positioned laterally at either side of the last-named positions it will permit drainage of pressure oil from the corresponding cylinder, said valve otherwise at all times acting to block drainage from both cylinders.

7. A tractor lifting mechanism, comprising a frame member secured to the rear axle of the tractor and extending vertically with relation to said axle, radius arms pivoted to points near the top of said frame member, a load-carrying sweep pivotally supported upon the outer ends of the radius arms, arms on said sweep, a hydraulic cylinder on each of said radius arms each having operative connection with a sweep arm and being actuated by the hydraulic pressure therein to hold the sweep in substantially horizontal position while lifting a load, means including a hydraulic cylinder pivoted at its rear end to the upper part of the frame adjacent the point of pivoting of the radius arms, and a lever system on the radius arms connected with the cylinder to be operated thereby and including a fulcrum link pivoted at one end to the lower end of the frame member, for swinging said radius arms and load-carrying member to an elevated position while the first-named cylinders maintain said load-carrying members horizontal by means of hydraulic pressure.

8. A tractor lifting mechanism, comprising a frame member secured to the rear axle of the tractor and extending vertically with relation to said axle, radius arms pivoted to points near the top of said frame member, a load-carrying sweep on the outer ends of the radius arms, a transverse shaft mounted for oscillation on the radius arms, a lever system comprising pairs of lever arms rigidly connected with and toward the ends of the shaft and extending therefrom at broad angles to one another, a hydraulic cylinder having a piston rod connected with one of said lever arms, and a fulcrum link connected at its upper end with the other of said lever arms and at its lower end with the lower part of the frame member, whereby operation of the cylinder will swing said radius arms and load-carrying member to an elevated position while holding the sweep with its load-carrying parts in horizontal position.

9. A tractor lifting mechanism, comprising a frame member secured to the rear axle of the tractor and extending vertically with relation to said axle, radius arms pivoted to points near the top of said frame member, a load-carrying sweep on the outer ends of the radius arms, a transverse shaft mounted for oscillation on the radius arms, a lever system comprising pairs of lever arms rigidly connected with and toward the ends of the shaft and extending therefrom at broad angles to one another, a hydraulic cylinder having a piston rod connected with one of said lever arms, a fulcrum link connected at its upper end with the other of said lever arms and at its lower end with the lower part of the frame member, whereby operation of the cylinder will swing said radius arms and load-carrying member to an elevated position while holding the sweep with its load-carrying parts in horizontal position, a back to the sweep embodying spaced upright arms, a pair of correspondingly spaced hydraulic cylinders carried by the radius arms having operative connection with the arms on the sweep, and means for simultaneously operating said last-named cylinders.

10. In a tractor lifting mechanism, a pair of pivoted lifting members having attached thereto a load-carrying part, a hydraulic cylinder mounted along each of said lifting members for conjointly effecting lifting of the load-carrying part, a second pair of hydraulic cylinders mounted on the lifting members and having connection with the load-carrying part for operating the same, an oil pump, a single valve chamber having passageway connections with the pump and with the respective two sets of cylinders, a single endwise movable valve piston in said chamber, said valve and the chamber having complementary passageways extending respectively to the first-named hydraulic cylinders and to the second-named hydraulic cylinders, said respective chamber and piston passageways being so related that movement of the valve endwise can alternately connect the oil pump to convey pressure oil to either set of cylinders and simultaneously to eliminate the conveying of pressure oil to the other set of cylinders.

11. In combination with a valve plunger adapted to effect supply of fluid to a plurality of fluid motors selectively by being moved longitudinally in a straight line and a support for said plunger, a valve operator pivotally connected at its forward end to said plunger, a support for said valve operator overlying said operator and pivotally connected at one side to the plunger support, and an operating handle overlying the support and connected to the valve operator by pivot means extending axially at right angles to the pivot for the support.

12. In combination with a valve plunger adapted to effect supply of fluid to a plurality of fluid motors selectively by being moved longitudinally in a straight line and a support for said plunger, a valve operator pivotally connected at its forward end to said plunger, a support for said valve operator overlying said operator and pivotally connected at one side to the plunger support, an operating handle overlying the support and connected to the valve operator by pivot means extending axially at right angles to the pivot for the support, and a table on the pivoted support having thereon a series of stops for positioning the handle and so fixing the valve-operating position of the plunger valve.

13. In combination with a valve plunger adapted to effect supply of fluid to a plurality of fluid motors selectively by being moved longitudinally in a straight line and a support for said plunger, a valve operator pivotally connected at its forward end to said plunger, a support for said valve operator overlying said operator and pivotally connected at one side to the plunger support, an operating handle overlying the support and connected to the valve operator by pivot means extending axially at right angles to the pivot for the support, said handle being pivotally connected to swing away from the support and when so swung away to simultaneously move the valve operator support and the plunger to position the plunger, and an arcuate table on the operator support having a central or neutral stop and a series of stops stepped-up at each side thereof for positioning the handle and so fixing the valve-operating positions of the plunger.

HARRY L. JOHNSON.

REFERENCES CITED

The following references are of record in the file of this patent:

UNITED STATES PATENTS

| Number | Name | Date |
|---|---|---|
| 1,149,951 | Rushton | Aug. 10, 1915 |
| 1,164,455 | Blackaller | Dec. 14, 1915 |
| 1,249,877 | Young | Dec. 11, 1917 |
| 1,998,434 | Bach | Apr. 23, 1935 |
| 2,278,656 | Jeffrey | Apr. 7, 1942 |
| 2,295,917 | Schwan | Sept. 15, 1942 |
| 2,300,731 | Knarreborg | Nov. 3, 1942 |
| 2,332,742 | Mott | Oct. 26, 1943 |
| 2,349,335 | Baldwin | May 23, 1944 |
| 2,363,986 | Mott | Nov. 28, 1944 |